(12) United States Patent
Shamir

(10) Patent No.: US 12,314,275 B2
(45) Date of Patent: May 27, 2025

(54) CROSS-LIST LEARNING TO RANK

(71) Applicant: Google LLC, Mountain View, CA (US)

(72) Inventor: Gil Shamir, Sewickley, PA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/449,236

(22) Filed: Aug. 14, 2023

(65) Prior Publication Data

US 2025/0061117 A1     Feb. 20, 2025

(51) Int. Cl.
   *G06F 16/00*             (2019.01)
   *G06F 16/2457*      (2019.01)

(52) U.S. Cl.
   CPC .............................. *G06F 16/24578* (2019.01)

(58) Field of Classification Search
None
See application file for complete search history.

(56) References Cited

U.S. PATENT DOCUMENTS

| | | | | |
|---|---|---|---|---|
| 11,803,556 | B1 * | 10/2023 | Samdani | G06F 16/24578 |
| 2014/0219563 | A1 * | 8/2014 | Rodriguez-Serrano | G06F 18/2411 |
| | | | | 382/182 |
| 2017/0011279 | A1 * | 1/2017 | Soldevila | G06V 30/226 |
| 2019/0034793 | A1 * | 1/2019 | Kataria | G06N 3/048 |
| 2019/0251612 | A1 * | 8/2019 | Fang | G06Q 30/0643 |
| 2019/0311275 | A1 * | 10/2019 | Huang | H04L 67/55 |
| 2020/0388384 | A1 * | 12/2020 | Kunitomi | G16H 70/60 |
| 2021/0383254 | A1 * | 12/2021 | Renders | G06N 3/045 |
| 2022/0374483 | A1 * | 11/2022 | Hunt | H04L 67/55 |
| 2023/0004819 | A1 * | 1/2023 | Qu | G06F 16/3347 |
| 2023/0244727 | A1 * | 8/2023 | Liu | G06N 20/20 |
| | | | | 707/706 |
| 2023/0376328 | A1 * | 11/2023 | Nagar | G10L 21/003 |
| 2024/0152545 | A1 * | 5/2024 | Jebara | G06F 16/9024 |

OTHER PUBLICATIONS

Burgess et al., "Learning to Rank using Gradient Descent", Conference on Machine Learning, Aug. 7-11, 2005, Bonn, Germany, pp. 89-96.

Burges et al., "Learning to Rank with Nonsmooth Cost Functions", Conference on Neural Information Processing Systems, Dec. 10-16, 2006, Vancouver, Canada, pp. 193-200.

Cao et al., "Learning to Rank: From Pairwise Approach to Listwise Approach", International Conference on Machine Learning, Corvallis, Oregon, United States, Jun. 20-24, 2007, pp. 129-136.

Jarvelin et al., "Cumulated Gain-Based Evaluation of IR Techniques", ACM Transactions on Information Systems, vol. 20, Issue 4, Oct. 1, 2002, pp. 422-446.

(Continued)

*Primary Examiner* — Hasanul Mobin
(74) *Attorney, Agent, or Firm* — DORITY & MANNING P.A.

(57) ABSTRACT

Provided are systems and methods that perform learning to rank using training data for two or more different training lists. Specifically, a training dataset can include a number of training examples. Each training example can include a query and a plurality of items that are potentially responsive to the query. The ranking model can be trained using pairs of items taken from two different training examples.

20 Claims, 7 Drawing Sheets

(56) References Cited

OTHER PUBLICATIONS

Radlinski et al., "Query Chains: Learning to Rank from Implicit Feedback", International Conference on Knowledge Discovery in Data Mining, Chicago, Illinois, United States, Aug. 21-24, 2005, pp. 239-248.

Wikipedia, "Learning to Rank", retrieved on Jan. 31, 2024, 5 pages.

\* cited by examiner

CROSS-LIST LEARNING TO RANK

FIELD

The present disclosure relates generally to machine learning to perform item ranking. More particularly, the present disclosure relates to systems and methods that perform learning to rank using training data for two or more different training lists.

BACKGROUND

Ranking is an important aspect of various systems or applications such as recommendation systems, information retrieval systems (e.g., search engines), and/or other systems. Ranking can refer to the concept of defining a relative ordering between potential items as responses to a particular query. A query can be implicit (e.g., defined based on context) or explicit (e.g., defined based on specific natural language and/or image input (e.g., input by a user)). A query can be user-agnostic or user-specific. Thus, items that are candidates for providing as a response to the query can be ranked, where, for example, the ranking orders the items from most relevant to less relevant.

Ranking is related to but distinct from determining a relevance score for an item relative to a query. For example, while ranking defines a relative ordering between items, a relevance score for a particular item can indicate how relevant the item is for a particular query, irrespective of other potential candidate responses to the query. One example form of a relevance score is an engagement score. In some instances, an engagement score can indicate a probability that a user will "engage" (e.g., select for further evaluation, information gathering, "click through", etc.) a particular item if it is presented as a response to a query. In some instances, relevance scores (e.g., an engagement score) can be predicted or otherwise represented using one or more labels (e.g., a single label indicating a likelihood of engagement or an actual engagement outcome).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform cross-list learning to rank. The method includes obtaining, by a computing system comprising one or more computing devices, a first training example and a second, different training example, the first training example comprising a first plurality of items and a first query, and the second training example comprising a second plurality of items and a second query. The method includes processing, by the computing system, a first item from the first plurality of items with a ranking model to generate a first intermediate representation for the first item. The method includes processing, by the computing system, a second item from the second plurality of items with the ranking model to generate a second intermediate representation for the second item. The method includes determining, by the computing system, a correlation score between the first query and the second query. The method includes evaluating, by the computing system, a weighted pairwise ranking loss based on the first intermediate representation, the second intermediate representation, the correlation score, a first label associated with the first item, and a second label associated with the second item. The method includes modifying, by the computing system, the ranking model based on the weighted pairwise ranking loss.

Another example aspect of the present disclosure is directed to one or more non-transitory computer-readable media that store computer-readable instructions that, when executed by a computing system, cause the computing system to perform operations. The operations include obtaining, by the computing system, a first training example and a second, different training example, the first training example comprising a first plurality of items and a first query, and the second training example comprising a second plurality of items and a second query. The operations include processing, by the computing system, a first item from the first plurality of items with a ranking model to generate a first intermediate representation for the first item. The operations include processing, by the computing system, a second item from the second plurality of items with the ranking model to generate a second intermediate representation for the second item. The operations include determining, by the computing system, a correlation score between the first training example and the second training example based at least in part on a first attribute associated with the first training example and a second attribute associated with the second training example. The operations include evaluating, by the computing system, a weighted pairwise ranking loss based on the first intermediate representation, the second intermediate representation, the correlation score, a first label associated with the first item, and a second label associated with the second item. The operations include modifying, by the computing system, the ranking model based on the weighted pairwise ranking loss.

Another example aspect of the present disclosure is directed to a computing system to perform cross-list learning to rank to distill from a teacher ranking model to a student ranking model, the computing system configured to perform operations. The operations include obtaining, by the computing system, a first training example and a second, different training example, the first training example comprising a first plurality of items and a first query, and the second training example comprising a second plurality of items and a second query. The operations include processing, by the computing system, a first item from the first plurality of items with the teacher ranking model to generate a first teacher intermediate representation for the first item. The operations include processing, by the computing system, a second item from the second plurality of items with the teacher ranking model to generate a second teacher intermediate representation for the second item. The operations include processing, by the computing system, the first item from the first plurality of items with the student ranking model to generate a first student intermediate representation for the first item. The operations include processing, by the computing system, the second item from the second plurality of items with the student ranking model to generate a second student intermediate representation for the second item. The operations include determining, by the computing system, a correlation score between the first query and the second query. The operations include evaluating, by the computing system, a weighted pairwise ranking loss based on the first teacher intermediate representation, the second teacher intermediate representation, the first student intermediate representation, the second student intermediate representation, the correlation score, a first label associated with the first item, and a second label associated with the second item. The operations include modifying, by the computing system, at least the student ranking model based on the weighted pairwise ranking loss.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1A:
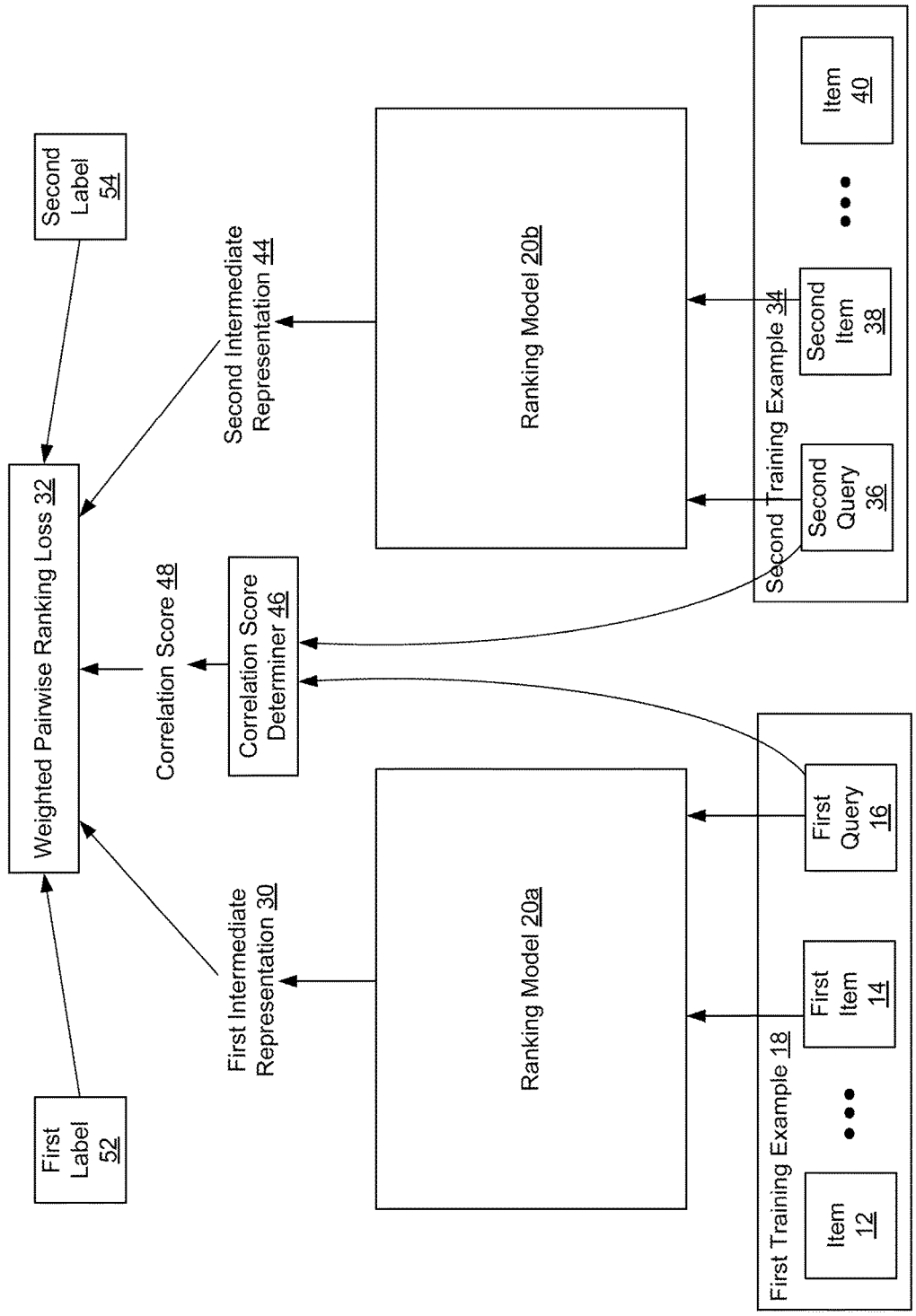
FIGS. 1A and 1B depict diagrams of example frameworks to perform cross-list learning to rank according to example embodiments of the present disclosure.

Example aspects of the present disclosure are directed to systems and methods that perform learning to rank using training data for two or more different training lists. Specifically, a training dataset can include a number of training examples. Each training example can include a query and a plurality of items that are potentially responsive to the query. Certain existing systems train a machine-learned ranking model on such training data using a pairwise or listwise loss applied on individual training examples. In contrast, aspects of the present disclosure enable the ranking model to also be trained using pairs of items taken from two different training examples. For example, a training system can generate a correlation score between the two queries associated with the two different training examples. A pairwise ranking loss evaluated for two items taken from the two different training examples can be weighted based on the correlation score (e.g., where more weight is given when the two queries or more correlated or similar, and vice versa). In such fashion, per-list (or per-query) pairwise or listwise ranking algorithms can be enhanced to also leverage information combined from two or more different training examples or lists, thereby improving ranking over lists of items for learning systems, such as recommendation systems.

Some example implementations can apply the cross-list training approach to items in other lists that may be in the same training batch. Thus, in systems in which multiple lists are aggregated into a training batch, the approach can be applied over the batch. Alternatively or additionally, training examples can be clustered (e.g., as part of a batch generation process) based on similarity measurements of the query of the currently processed list to other lists. Thus, items that are in another list where the list was recommended for a similar or almost similar query can be paired for optimization of the ranking loss with the list which is currently optimized.

Thus, the present disclosure introduces a novel approach to learning to rank using training data for multiple training lists. By incorporating pairs of items taken from different training examples, the ranking model can be trained more effectively, resulting in improved ranking over lists of items in learning systems such as recommendation systems. This approach allows for the leveraging of additional information combined from different training examples or lists, enhancing the performance of per-list or per-query ranking algorithms.

One technical effect of this technology is the ability to apply the cross-list training approach to items in other lists within the same training batch. This means that in systems where multiple lists are aggregated into a training batch, the approach can be applied across the entire batch. Additionally, training examples can be clustered based on similarity measurements of the query to other lists, further optimizing the ranking loss by pairing items from lists that are recommended for similar or almost similar queries. This can result in faster optimization of a machine learning model, thereby conserving computational resources such as processor usage, memory usage, etc.

In addition, while the proposed techniques can be applied directly to the true labels when training the ranking loss with the true labels, the proposed techniques can also be applied in a distillation setting, where labels are provided by a relatively more complex teacher model, and a relatively simpler production student model (e.g., that may be task specific) is to be trained. The methodology can also suit generative models as well as applied to Large Language Models (LLMs) and also to client models of LLMs (e.g., specifically in the distillation setup).

Therefore, another technical effect is the applicability of the proposed techniques in both true label training and distillation settings. In the distillation setting, where labels are provided by a more complex teacher model, the proposed techniques can be applied to train a simpler production student model. This flexibility allows for the technology to suit a wide range of models and deployment scenarios.

Furthermore, while the proposed cross-list ranking can be applied across similar queries, it can also be applied to pairs of training examples that are correlated based on other attributes or features (e.g., beyond query-specific features). For example, the cross-list ranking approach can be applied to pairs of training examples included in the same data slice (e.g., where the data slice was generated based on a specific attribute or value such as a particular feature for the items). As such, various similarity metrics can be used to guide list aggregation for generation of cross-list ranking losses.

Thus, the cross-list ranking approach is not limited to similarity based on query-specific features. It can also be applied to pairs of training examples correlated based on other attributes or features beyond the query. For example, pairs of training examples included in the same data slice, generated based on a specific attribute or value, can be used for cross-list ranking. This versatility in similarity metrics enables the generation of cross-list ranking losses guided by various aspects, enhancing the overall performance of the ranking model.

Description of Example Setting and Learning to Rank

In the context of recommendation systems, information retrieval systems, and/or other similar systems, the term "items" can refer to any object, entity, unit, file, or other element. As examples, items can include users, entities, movies, data files, websites, products, documents, resources, and/or other items or objects. Items can be identified and returned in response to a query. A query can be implicit (e.g., defined based on context) and/or explicit (e.g., defined based on specific natural language and/or image input (e.g., input by a user)). A query can be user-agnostic or user-specific. A query can include one or more modalities of data such as textual data, image data, and/or audio data.

Recommendation systems and other similar systems often train on a large number of training examples, where each training example includes items produced in a group (or set or list) in response to a given request or query. In particular, example approaches described herein can be applied to (e.g., trained on) data from multiple different training examples.

In some implementations, each training example can include a plurality of items and a plurality of labels respectively associated with the plurality of items. As one example notation, the plurality of items can include N items with index i and let $y_i \in \{0,1\}$ denote the true label associated with (e.g., observed for) item i.

The label for each item can indicate a level of engagement for such item. For example, the label can be a unit label that ranges from 0 to 1, where 0 indicates no engagement and 1 indicates complete engagement. In one example, a label of 0.7 can indicate a 70% probability of engagement. One type of unit label is a binary label that explicitly equals either 0 or 1.

The label can be predicted or can be based on a real-world interaction. As one example, a training example can be generated based on a user's interaction with a recommendation or information retrieval system. A user can enter a query into the system and the system can return (e.g., using some existing logic or algorithms) a set of items as a response to the query. The user can be able to engage with (e.g., select, choose, investigate, etc.) one or more (e.g., multiple) of the items in the list.

Once the user's interaction has been completed, the query and the items can be saved as a training example. A label can be assigned to each item in the training example. For example, if the user engaged with the item, then a label equal to 1 can be assigned to the item. However, if the user did not engage with the item, then a label equal to 0 can be assigned to the item. It is possible that multiple items in the set of items have labels equal to 1 (or otherwise indicating engagement). The above process is provided as one example only, different approaches can be used to generate a training example as well.

A ranking model can be trained on training examples having the structure described above. The training process can consume groups of items included in respective training examples, and can train on all items in the group. This disclosure uses the index t to denote the index in the training set of the t-th group, or item set. Due to huge scales in such systems (e.g., click-through-rate (CTR) and others), prior approaches to training focus on learning (marginalized) individual engagement rates for the individual items.

Recommendation systems are asked to provide a user with a list of items that are most relevant to the user's query. In information retrieval, the ranking of the items matters more than actually predicting probabilities of relevance labels. Many retrieval applications thus learn a ranking score for an item, which cannot be directly translated into a prediction of some graded relevance label, but can be used to place the item in the list against other items. Other applications, like Click-Through-Rate (CTR) prediction, care about both, an accurate prediction of the user's engagement label, and also best ranking among the items, so that the most relevant items show on the most accessible top of the recommendation list.

Ranking objectives may not be aligned with pointwise per-item objectives that minimize training losses, such as cross entropy using logistic regression. This is because pointwise losses may not properly model interactions between co-recommended items, and also because of model misspecification (or underspecification) that is present in all real system models. Misspecification is the result of engineered features that may not model the exact causes of the actual user actions. Thus, using pointwise objectives may lead to ranking performance that is inferior to that obtained when training using ranking specific objectives.

The learning to rank literature consists of numerous techniques proposed to improve ranking performance subject to various different ranking metrics. Techniques include modifying pointwise losses to better model ranking, as well as using pairwise and listwise losses. Pairwise methods apply a loss on pairs of items that are shown to the user in the same list, either on all pairs in the list or only on pairs of items with unequal labels (omitting pairs for which the labels are equal). One pairwise approach for binary labels attempts to minimize the Area Under the Curve (AUC) loss, which amounts to the probability that an item with a negative true label received a prediction for a positive label which is larger than an item with a positive label. Pairwise losses have also been designed for nonbinary ranking problems. An example is the LambdaRank approach, in which the loss has been designed to maximize the Normalized Discounted Cumulative Gain (NDCG) retrieval metric. Listwise methods apply losses to the list of items, usually pairing an item with a high relevance label with all other items in the list in one loss. One example is the Softmax listwise loss, though many different variants have been designed. Ranking losses, such as RankNet, LambdaRank, Softmax, and others have been shown to perform better on ranking tasks than pointwise losses that are applied on individual items.

According to an aspect of the present disclosure, while the loss functions described above can be applied on pairs or lists of items in one list shown to the user, they can also be modified so that they can be applied to pairs or lists aggregated from different lists shown to the user. Similarly, evaluation metrics like AUC and variants of NDCG can be computed across windows of data, not necessarily keeping per-query or per-displayed list boundaries. For example, in many applications that use fast tensor processing units (TPUs), multiple lists may be combined to a single training batch, and the ranking loss can be applied on the aggregation of lists in the batch, applying it to pairs where each item in the pair originated from a different list that was displayed in response to a different query.

Applying ranking losses in this manner can improve metrics like AUC when aggregated on the training batch. However, improving such metrics may not necessarily improve similar per-list (or per-query) metrics. This is because queries aggregated in the same batch may be very different. One query can lead to one list of recommendations and the other may rank the same recommendation in opposite relevance. Pairing items from two such queries may actually reduce per-query or per-list ranking accuracy.

In addition, in many recommendation applications, the per-query list may be rather short and consists of only a few items. It may be suboptimal to pair an item in such a short list only with items in the same list as the training batch may include many similar or very relevant queries to the query being processed. Applying pairwise or listwise losses only within a single query or list may not leverage information that the model can have to improve its per-list ranking.

In view of the above, the present disclosure proposes a technique that can leverage information in similar or otherwise correlated queries to improve per-query or per-list ranking. The method can be applied to any type of ranking problem (e.g., whether it is binary labels, or graded relevance labels). Example implementations of the proposed method can be referred to as Cross-list Learning to Rank, or Cross-list Ranking (XLR), or Cross Batch Ranking (XBR).

While the discussion provided herein focuses on a training batch which consists of multiple queries, the same technique can be also used across a whole training datasets to aggregate (or cluster) queries that are similar or almost similar, and apply pairwise or listwise ranking losses on aggregated lists of such queries.

In particular, with the rapid development and exposure of generative models, the proposed approach can be used to better train generative models by enriching the context provided to each item with the data in similar queries or similar text contexts, as well as in "ranking" methods used for reinforcement learning with human feedback (RLHF).

The proposed technique can be used directly on the true labels of batches or clusters of queries. It can also be used in distillation setup (such as that used with Large Language Models (LLMs)), where a complex model is used to distill labels to simpler models. Again, pairs or lists can be aggregated for a pairwise or listwise training loss, respectively, from multiple queries in the batch, where the loss is applied to the predictions or labels provided by the complex teacher model.

Description of Pairwise Ranking Loss Functions

This section first reviews some ranking methods within a list of items, starting with the binary labels case. Consider a list of N items. The items can be from a list shown to a user in response to some query. A model predicts a logit score si for item i in the list. The score can be converted to a probability of the item having a positive label with the standard logistic (Sigmoid) function. A Softplus surrogate (to AUC) per-query pairwise loss aggregated on all pairs of the list is given by $$L_{ranking} = \sum_{i=1}^{N} \sum_{j=1, j \neq i}^{N} y_{ij} \log[1 + \exp(s_j - s_i)] \quad (1)$$

where $y_{ij} \in \{0, 0.5, 1\}$ is a pairwise label, which takes value 1 if the label $y_i$ of item i is positive and the label $y_j$ of item j is negative. It takes value 0 for the opposite event. A label of $y_{ij}=0.5$ can be defined if the labels of item i and item j are equal $y_i=y_j$. However, the loss can optionally be computed only for pairs in which the labels are unequal, revising equation (1) to $$L_{ranking} = \sum_{i:y_i=1} \sum_{j:y_j=0} y_{ij} \log[1 + \exp(s_j - s_i)] \quad (2)$$

and omitting the label value 0.5 from the set of values of $y_{ij}$.

Under assumption of item independence, the loss in (2) can be expressed with the same logit scores used for the individual items with a standard cross entropy logistic regression loss. The ranking loss applied in training to a model is the aggregation of the ranking losses over all lists in the training dataset.

In a similar manner, the softmax listwise loss can be defined with respect to the logit scores of the individual items.

$$L_{ranking} = -\sum_{i=1}^{N} y_i \log\left[\frac{\exp(s_i)}{\sum_{j=1}^{N} \exp(s_j)}\right] = \sum_{i=1}^{N} y_i \log\left[1 + \sum_{j=1, j \neq i}^{N} \exp(s_j - s_i)\right] \quad (3)$$

where the labels $y_i$ are the binary labels as defined earlier.

Ranking losses can also be defined in a distillation setting, where, for example, pairwise differences of logit scores $t_i$ predicted by the teacher are distilled to pairwise logit score differences of the student. An example is pairwise L2 (square) loss given by $$L_{ranking-disillation} = \sum_{i=1}^{N} \sum_{j=1, j \neq i}^{N} [(t_i - t_j) - (s_i - s_j)]^2 \quad (4)$$

The loss in (4) can be applied on all pairs in the list independently of the true labels. It can however be applied as equation (2) only to pairs with unequal true labels (in applications in which the true label is known). The advantage of applying the loss on all pairs is that it relays the beliefs of the teacher to the student on pair relationships, generalizing over all data points, even in applications with high class imbalance. On the other hand, it can also mix beliefs for different populations with different pair ranking statistics in cases where the student model is highly underspecified, but the teacher is still able to differentiate between such populations. The loss in equation (4) can also be converted to a linear complexity computed listwise loss. (Note that just using (4) requires a quadratic number of operations.) Other pairwise and listwise losses can be used for binary label ranking directly or in a distillation setup.

In nonbinary graded label applications, where one predicts labels representing multiple relevance values (classes), various ranking losses can be applied. The LambdaRank loss is given by $$L(y, s) = \sum_{y_i > y_j} |G_i - G_j| \cdot \left|\frac{1}{D_i} - \frac{1}{D_j}\right| \cdot \log\left(1 + e^{-(s_i - s_j)}\right) \quad (5)$$

where $G_i$ is a gain applied to item i by the value of its label (possibly normalized by the maximal gain for a list), and the reciprocal of $D_i$ is a discount applied to each item based on its relative position determined by the scores si given by the model. Unlike the binary cases described above, the scores si may not be related to the actual label value probability. Various methods, such as ordinal regression can be applied to pairwise and listwise ranking methods when label predictions do matter, preserving also scores that can be translated into probabilities of each of the label values.

Cross-List Learning to Rank

The losses described above are normally applied to each list of items, where multiple lists make the training dataset.

However, a general idea proposed herein is to aggregate lists so that ranking loss training can capture additional interactions between items that are not on the same list, but are on lists which were provided to the user as a result of highly correlated queries. An important step is the aggregation of lists unveiling these correlations either within a training batch, or within the full training dataset. Once these correlations are used to combine lists, similar ranking losses to those described in equations (1)-(5) can be applied on pairs in the larger aggregated lists. The correlations between queries allow scaling down the contribution of pairs from different lists (or of different lists). For example, higher correlations can lead to larger scaling of the loss relative to the respective lists, and lower correlations can scale these losses down.

Example implementations of this approach can be applied to deep network models whose inputs are embeddings representing the input features. Let $E_o^0(q, i)$ be an input layer of embeddings of all "other" features excluding query only features for item i in query list q. Let $E_q^0(q, i)$ be an input layer of embeddings of all query-only features for item i in query list q. The superscript 0 is used to denote that these are the input layers, each of which is a concatenation of embeddings for all features in the layer. Let $(W_o^1, b_o^1)$ and $(W_q^1, b_q^1)$ be the weights and biases learned by the network for transitioning from the other features' embeddings and the query features' embeddings to the next other features and query layers.

Then, $E_o^1 = W_o^1 E_o^0 + b_o^1$ is an embedding layer describing all other features (which no longer distinguishes between different features), and similarly $E_q^1 = W_q^1 E_q^0 + b_q^1$ is an embedding layer describing the aggregation of all the query-only features. For convenience, we omitted the query and item indices q and i from the layer equation, but they should be understood as applied for a list q and an item i in the list. Also note that we can omit this step, and use $E_q^0$ instead of $E_q^1$ for the correlation computation.

The remainder of the network may have any architecture, but as one example, consider a fully connected network, for which the layer l has activities $Z^l = f(W^{l-1} Z^{l-1} + b^l)$ where $f(\cdot)$ is the activation nonlinearity, and $(W^l, b^l)$ are learned matrix weights and biases. The output scalar score is given by $s = w^L Z^L + b^L$, where $w^L$ is now a vector of multipliers of the last L-th layer, and $b^L$ is a scalar bias. The first layer $Z^1 = [E_q^1, E_o^1]$ can be the concatenation of the two initial embedding layers, or, as mentioned, can alternatively be the input embeddings $Z^0 = [E_q^0, E_o^0]$.

The query correlation can now be computed correlating $E_q^1$ (or $E_q^0$) for query list q, denoted for convenience by $E_q$, with $E_r$ for query list r. Various correlation scores can be used. One such score is the cosine similarity, given by $$C_{qr} = \frac{\langle E_q, E_r \rangle}{\|E_q\| \cdot \|E_r\|} \quad (6)$$

where $\langle \cdot, \cdot \rangle$ denotes inner or dot product between the vectors and $\|\cdot\|$ denotes the standard Euclidean L2 norm. Other correlation metrics that can be used are metrics such as the covariance between the two embedding vectors. Given that some example implementations use $C_{qr}$ to scale down the ranking loss, one option is to take the absolute value of $C_{qr}$ and we use metrics for which $|C_{qr}| \in [0,1]$. Note that for $r=q$, $C_{qr}=1$ by definition. This should hold for different items in the same list as well.

To compute the extended query ranking loss some example implementations can also leverage two additional hyperparameters. First, some example implementations can scale down contributions in pairs that are not in the same list with the parameter $\mu$: $0 < \mu \leq 1$, where we define $$\mu(q, r) = \begin{cases} 1, & q = r \\ \mu, & q \neq r \end{cases}$$

Some example implementations can also use a threshold $\tau$: $0 \leq \tau < 1$, where we only pair items for which the correlation metric is greater than or equal to $\tau$. One example extended cross-list pairwise ranking loss for the loss defined in equation (2) is thus given by $$L_{xlr-ranking} = \quad (7)$$

$$\sum_{q=1}^{Q} \sum_{r=1}^{Q} \sum_{\substack{i_q=1 \\ y_{i_q}=1}}^{N_q} \sum_{\substack{j_r=1 \\ y_{j_r}=0}}^{N_r} I(|C_{qr}| \geq \tau) \cdot \mu(q, r) \cdot |C_{qr}| \cdot y_{i_q j_r} \log[1 + \exp(s_{j_r} - s_{i_q})]$$

where $i_q$ and $j_r$ are the item indices of the lists for queries q and r, respectively, $N_q$ and $N_r$ are the item counts for the lists for queries q and r, respectively, and $I(\cdot)$ is the indicator function. All three multipliers; the indicator, the scaling and the absolute correlation term, can be included, or any subset of the three can be chosen to be included in the loss. The loss in equation (1) can be extended similarly to equation (7), except that the inner two sums can take the form of equation (1) with respect to the corresponding item counts.

The ranking losses of equations (3)-(5), and also other pairwise and listwise ranking losses, can be extended in similar manners. For binary labels, the summand of the listwise loss in (3) is nonzero only for items with positive labels. The outer summation over queries can be applied outside the logarithm aggregating all queries, whereas the softmax expressions in the denominator inside the log can be extended with items in the aggregated lists, giving $$L_{xlr-list-ranking} = \quad (8)$$

$$-\sum_{q=1}^{Q} \sum_{i_q=1}^{N} y_{i_q} \log \left[ \frac{\exp(s_{i_q})}{\sum_{r=1}^{Q} \sum_{j_r=1}^{N_r} I(|C_{qr}| \geq \tau) \cdot \mu(q, r) \cdot |C_{qr}| \cdot \exp(s_{j_r})} \right]$$

This expression matches every positive item with the extended list of all items in the aggregated set of queries. Again, any combination of the indicator, scaling and correlation term can be included in the loss.

The distillation loss in equation (4) can be extended to include query lists similarly to the pairwise loss in (7), as follows:

$$L_{xlr-ranking-distillation} = \quad (9)$$

$$\sum_{q=1}^{Q} \sum_{r=1}^{Q} \sum_{i=1}^{N} \sum_{\substack{j=1, j \neq i}}^{N} I(|C_{qr}| \geq \tau) \cdot \mu(q, r) \cdot |C_{qr}| \cdot \left[ (t_{i_q} - t_{j_r}) - (s_{i_q} - s_{j_r}) \right]^2$$

Similarly, the LambdaRank loss can be extended to $$L(y, s) = \sum_{q=1}^{Q}\sum_{r=1}^{Q}\sum_{y_{i_q}>y_{j_r}} I(|C_{qr}| \geq \tau) \cdot \qquad (10)$$

$$\mu(q,r) \cdot |C_{qr}| \cdot |G_{i_q} - G_{j_r}| \cdot \left|\frac{1}{D_{i_q}} - \frac{1}{D_{j_r}}\right| \cdot \log\left(1 + e^{-(s_{i_q} - s_{j_r})}\right)$$

The discount terms, which are the reciprocals of $D_i$ for some i, are functions of the ranking within the list of item i. With the proposed extensions, they can be recomputed by ranking all the items in the aggregations of the queries by the model. Alternatively, they can keep their values within the original per query lists. The latter can be justified because of the additional scaling (down) obtained by the three correlation based multipliers. Attenuation of the mixed query terms can be achieved through the correlation multipliers; thus the discount terms can remain relative to the original per query list.

In some implementations, the proposed extensions in equations (7)-(10) can be applied by clustering all lists in the training dataset, but also by correlating lists inside the same training batch. The latter can be done in huge scale systems that train on batches of data, where a batch includes multiple lists, and the model training stage has no control of which queries are included in a training batch.

Additionally or alternatively, the loss in equation (7)-(10) or in any similar equation extending the other ranking losses can be normalized by some norm (such as L1 or L2) summing the total weight of the pairs on which the loss has been applied. If elements in the loss are all weighted with weight 1, the total weight is the total count of elements in the loss. For the pairwise loss in (1)-(2), the total weight equals the number of pairs in the loss. For equations (7)-(10) this weight also includes the downscaling correlation based multipliers, i.e., for pairs for which the correlation multipliers are smaller than 1, the contribution to the total weight equals the product of the multipliers. Total weights may be different for different queries, depending on the population of the dataset or the batch. Normalization may balance better between contributions of lists that repeat frequently, and those of lists that repeat less often. For example, normalization can be applied giving each query list equal weight in the cumulative total loss.

Figure 1B:
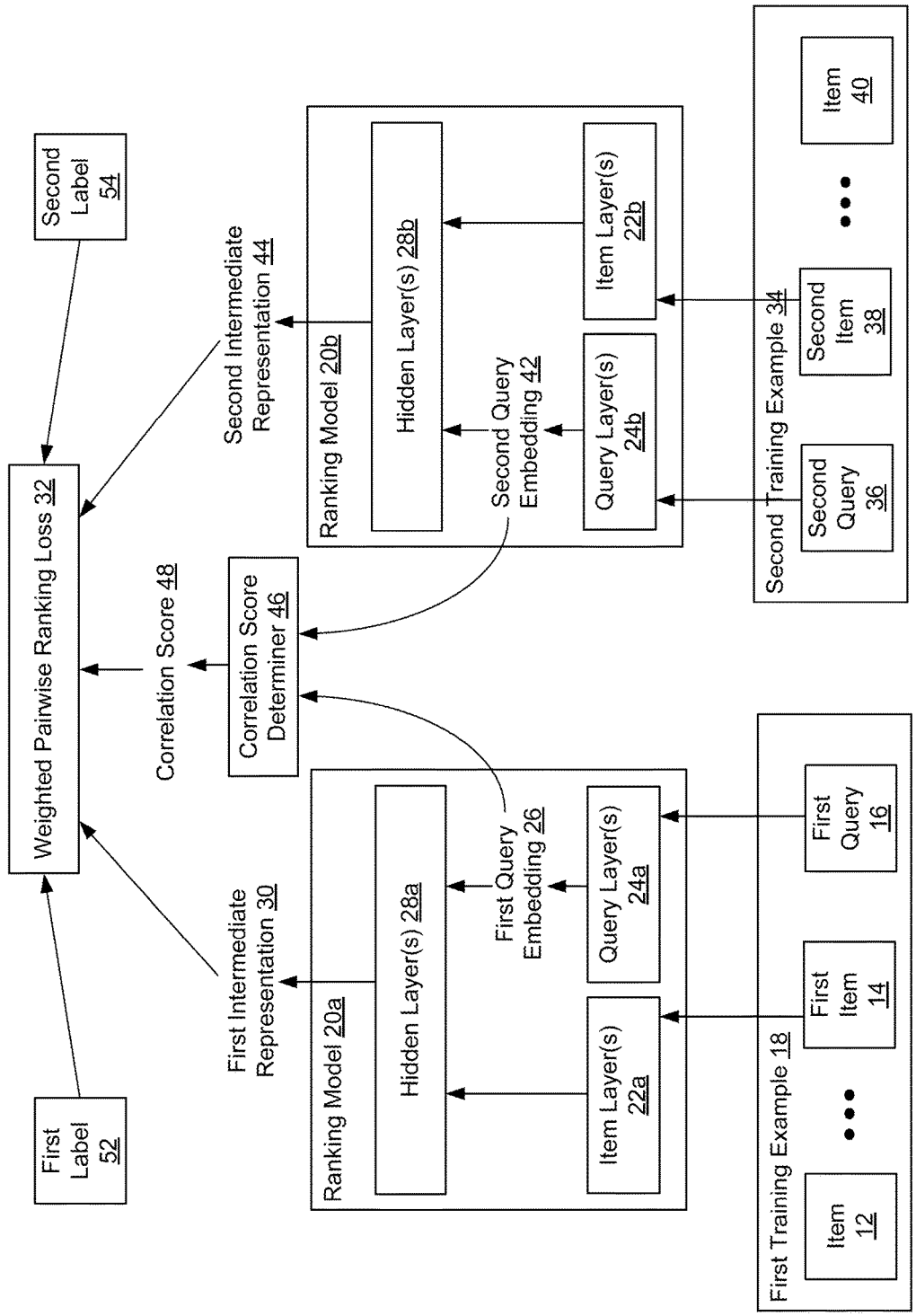

FIGS. 1A and 1B illustrate an example application of the ranking losses described above. In particular, referring first to FIG. 1A, a computing system can obtain a first training example 18 and a second, different training example 34. The first training example can include a first plurality of items (e.g., items 12-14) and a first query 16. The second training example 34 can include a second plurality of items (e.g., items 38-40) and a second query 36. The computing system can process a first item 14 from the first plurality of items with a ranking model 20a to generate a first intermediate representation 30 for the first item 14. The computing system can process a second item 38 from the second plurality of items with the ranking model 20b to generate a second intermediate representation 44 for the second item 38.

The computing system can determine (e.g., using a correlation score determiner 46) a correlation score 48 between the first query 16 and the second query 36. The computing system can evaluate a weighted pairwise ranking loss 32 based on the first intermediate representation 30, the second intermediate representation 44, the correlation score 48, a first label associated with the first item 52, and a second label associated with the second item 54. As examples, the weighted pairwise ranking loss 32 can be any of the cross-list loss functions described in this section. The computing system can modify the ranking model 20a/20b based on the weighted pairwise ranking loss 32. For example, the weighted pairwise ranking loss 32 can be backpropagated through the ranking model 20a/20b.

Note that FIG. 1A is showing a single cross-list pair of items for the sake of explanation. In practice, the proposed approach can be applied in parallel (e.g., batch-wide) to multiple pairs of items, including pair-wise loss on pairs of items included within the same training example and pair-wise loss on pairs of items included in different training examples.

Referring now to FIG. 1B, FIG. 1B shows a more detailed depiction of an example implementation of the ranking model. In the implementation shown in FIG. 1B, the computing system can generate a first query embedding 26 for the first query 16. For example, the computing system generate the first query embedding 26 for the first query 16 by processing the first query 16 with one or more query layers 24a of the ranking model 20a. The ranking model 20a can also include one or more item layers 22a that process the first item 14, and one or more hidden layers 28a that process the output of the item layer(s) 22a and the query layer(s) 24a to generate the first intermediate representation 30.

Likewise, the computing system can generate a second query embedding 42 for the second query 36. For example, the computing system generate the second query embedding 42 for the second query 36 by processing the second query 36 with one or more query layers 24b of the ranking model 20b. The ranking model 20b can also include one or more item layers 22b that process the second item 38, and one or more hidden layers 28b that process the output of the item layer(s) 22b and the query layer(s) 24b to generate the second intermediate representation 44.

As illustrated in FIG. 1B, the computing system (e.g., the correlation score determiner 46) can determine the correlation score 48 based on the first query embedding 26 and the second query embedding 42. For example, the computing system can evaluate a similarity metric between the first query embedding 26 and the second query embedding 42 to generate the correlation score 48.

In some implementations, to simplify the correlation computation, the ranking model 20a/20b can have a factorized architecture all the way from the input to the output. The query feature penultimate embedding is used to compute the correlation, and is then multiplied to produce a dot-product with the remaining "other" features' penultimate embedding. The dot product is then used to produce the final per-item score. Stated differently, with reference to FIG. 1B, in some implementations, the hidden layers 28a/28b may include only a simple final layer that applies a dot-product operation between the query embeddings 26/42 with the output from the item layer(s) 22a/22b to produce the intermediate representations 30/44 (e.g., which may be logit scores). In other implementations, the hidden layers 28a/28b may include multiple layers (e.g., including multiple non-linear activations).

Referring to both FIG. 1A and FIG. 1B, in some implementations, evaluating, by the computing system, the weighted pairwise ranking loss 32 based on the first intermediate representation 30, the second intermediate representation 44, the correlation score 48, the first label 52 associated with the first item 14, and the second label 54 associated with the second item 38 can include one or more of the following: scaling down, by the computing system, the weighted pairwise ranking loss 32 using a scaling factor in response to the first query 16 being different from the second query 36; evaluating, by the computing system, an identity function term included in the weighted pairwise ranking loss 32, wherein the identity function term equals zero when the correlation score 48 is less than a threshold score and equals one when the correlation score 48 is greater than the threshold score; and/or weighting, by the computing system, the weighted pairwise ranking loss 32 by an absolute value of the correlation score 48.

General Cross Feature Ranking

Recommendation models, such as a click-through-rate (CTR) prediction model can be designed for different applications. In many applications, the training dataset can be divided or sliced into different sets based on different features or attributes. For example, for advertisement use cases, the dataset contains different advertisements from the same advertiser in response to different queries.

The method described herein can be used to optimize ranking on slices other than lists or queries. That is, instead of applying the correlations in query level, they can be applied, for example, on the advertiser level or based on some other feature, attribute, or metadata associated with each training example. As one example, in display advertising, the approach can be applied to match training items on a publisher level. In other recommendation systems, we can consider matching lists on categories. For example, in video recommendation, the genre features can be correlated, and we can optimize ranking on that genre.

There are many other dimensions that cross-list ranking can be applied to for different systems and problems. Generally, this can be done over any subset of features or attributes in the model. The features that are used for "list aggregation" can replace the "query features" and query embeddings in FIGS. 1A and 1B, whereas all other model features can be included in the non-query features and embeddings in the figures. Then, ranking losses are applied as described herein (e.g., as described in equations (7)-(10)) with respect to the correlations computed over the desired feature dimensions.

In addition, list aggregation or clustering can be done over queries, ads/item categories, user features, user blindness features, and/or other data slices. As one example, some example implementations can rank items across similar queries that were placed in the same position in the list of items in response to a query, i.e., cross-list per-position ranking.

Figure 2:
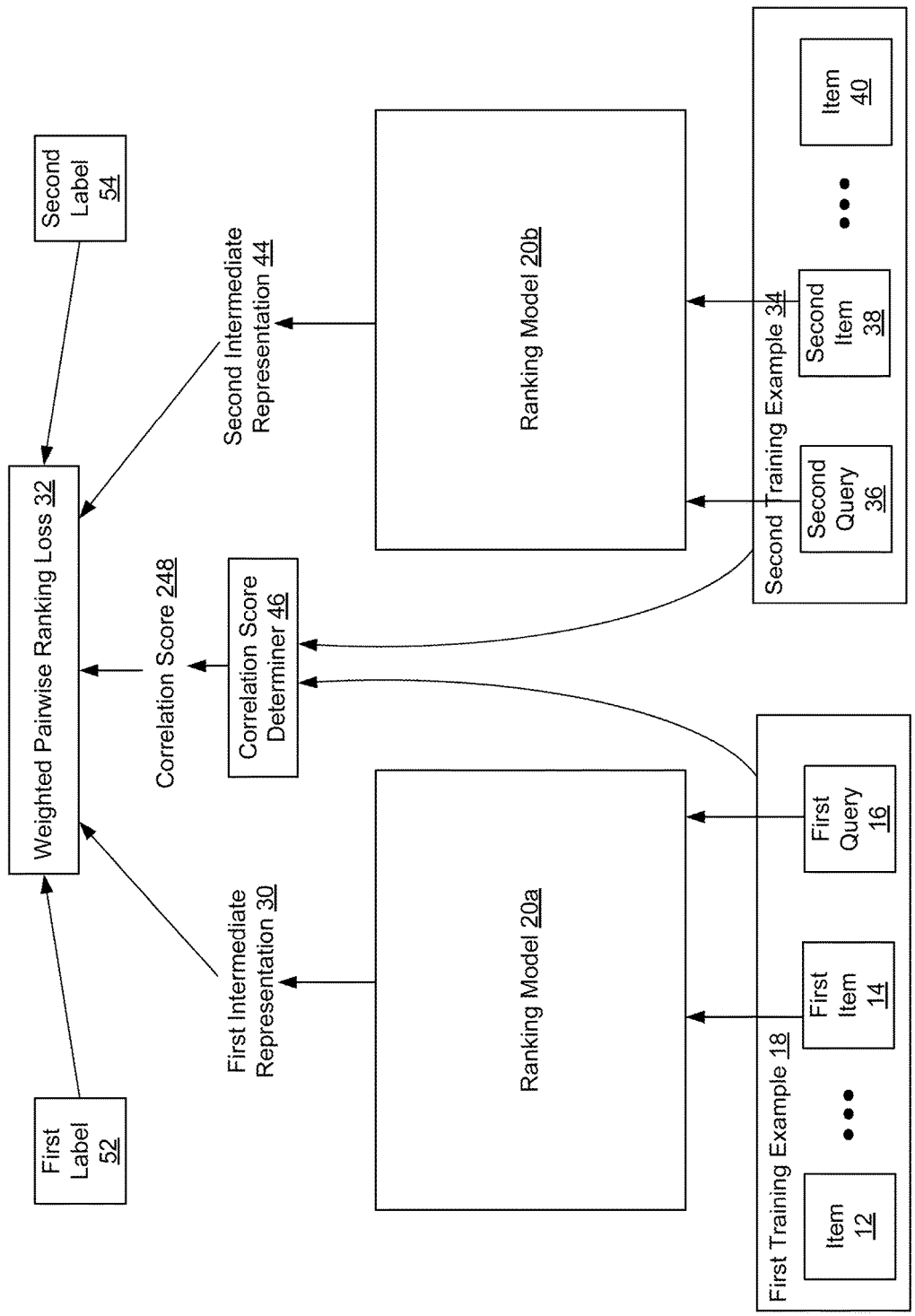
FIG. 2 depicts a diagram of an example framework to perform cross-list learning to rank according to example embodiments of the present disclosure.

FIG. 2 depicts an example of this general cross-feature training approach. FIG. 2 is similar to FIG. 1A, except that instead of determining the correlation score based on query features, the correlation is determined between training examples as a whole, based on some other feature, attribute, or metadata associated with the training examples.

Specifically, as shown in FIG. 2, a computing system can obtain a first training example 18 and a second, different training example 34. The first training example can include a first plurality of items (e.g., items 12-14) and a first query 16. The second training example 34 can include a second plurality of items (e.g., items 38-40) and a second query 36. The computing system can process a first item 14 from the first plurality of items with a ranking model 20a to generate a first intermediate representation 30 for the first item 14. The computing system can process a second item 38 from the second plurality of items with the ranking model 20b to generate a second intermediate representation 44 for the second item 38.

The computing system can determine (e.g., using a correlation score determiner 46) a correlation score 248 between the first training example 18 and the second training example 34. For example, the computing system can determine the correlation score 248 between the first training example 18 and the second training example 34 based at least in part on a first attribute associated with the first training example 18 and a second attribute associated with the second training example 34.

As one example, the first attribute can be a first feature of the first item 14 and the second attribute can be a second feature of the second item 38. For example, the first item 14 can be a first content item and the first attribute can be a first identity associated with a publisher of the first content item. Likewise, the second item 38 can be a second content item and the second attribute can be a second identity associated with a publisher of the second content item 38. Thus, in this example, the correlation score 248 indicates a correlation between the respective publishers of the first and second content items.

In another example, the first item 14 can be a first content item and the first attribute can be a first genre associated with the first content item 14. Likewise, the second item 38 can be a second content item and the second attribute can be a second genre associated with the second content item 38. Thus, in this example, the correlation score 248 indicates a correlation between the respective genres of the first and second content items.

As yet another example, the first attribute can be first user feature associated with the first query 16 and the second attribute can be a second user feature associated with the second query 36. Thus, in this example, the correlation score 248 indicates a correlation between the respective users that submitted the first query 16 and the second query 36.

Referring still to FIG. 2, the computing system can evaluate a weighted pairwise ranking loss 32 based on the first intermediate representation 30, the second intermediate representation 44, the correlation score 248, a first label associated with the first item 52, and a second label associated with the second item 54. As examples, the weighted pairwise ranking loss 32 can be any of the cross-list loss functions described herein. The computing system can modify the ranking model 20a/20b based on the weighted pairwise ranking loss 32. For example, the weighted pairwise ranking loss 32 can be backpropagated through the ranking model 20a/20b.

Example Clustering Technique

In addition or alternatively to applying a loss that is aggregated over all query pairs, the correlation metrics can be used for a pre-training clustering of lists in a batch or in the training dataset to produce aggregated query lists. Items recommended in response to similar queries will be aggregated into single lists. Then, a model can be trained with pairwise or listwise ranking losses over the clustered lists.

Thus, in some implementations, a computing system can actively select a first training example and a second training example for evaluation with the weighted pairwise ranking loss based on query similarity between the respective queries contained in the training examples. For example, the first training example and the second training example can be included in a training dataset that includes a plurality of training examples. The computing system can cluster the plurality of training examples into a plurality of training batches based on query similarity, whereby the first training example and the second training example are placed into a shared training batch for evaluation with the weighted pairwise ranking loss.

This can enable a larger amount of learning to occur for each batch of the training dataset, based on the inclusion of a larger number of correlated pairs, which each provide additional learning signal. Clustering the lists in this way can therefore lead to faster training and can conserve computational resources.

Example Cross Query Attention

The correlation score described in equation (6) uses embeddings formed for the query features by a network that trains on the recommendation label objective. Such a correlation describes similarity of two queries determined by the label objective.

An alternative approach is to compute similarity based on the ability to predict one query from the other. To produce such a similarity metric, some example implementations can apply an attention mechanism where a model is trained to predict the query embedding for one query from all other queries in the batch. The trained attention mechanism therefore produces a correlation matrix describing the correlation between one query and another. This correlation matrix can be used to replace the score in (6).

Thus, in some implementations, to determine a correlation score between a first query and a second query, a computing system can process one or both of the first query and the second query with an attention network to determine the correlation score between the first query and the second query, where the attention network has been trained to predict a query embedding for one query from other queries included in a training batch.

In addition, some example implementations can measure the prediction error of such a system relative to the embeddings representing a query, and scale down the correlation with larger errors. For example, some example implementations can use multi-head attention to diversify predictions of one query by the others, and pick the top correlations from each head. The recommended items for the queries with the top correlations to some query can be aggregated into the list of a query whose ranking loss is being applied.

Example Extension to Distillation

As shown in equation (9), some example implementations can extend ranking distillation approaches to cross-list ranking. Equation (9) shows how pairwise differences can be distilled from a teacher to a student across-lists with L2 (MSE) loss. Other losses can be applied as well to distill across-lists.

Figure 3:
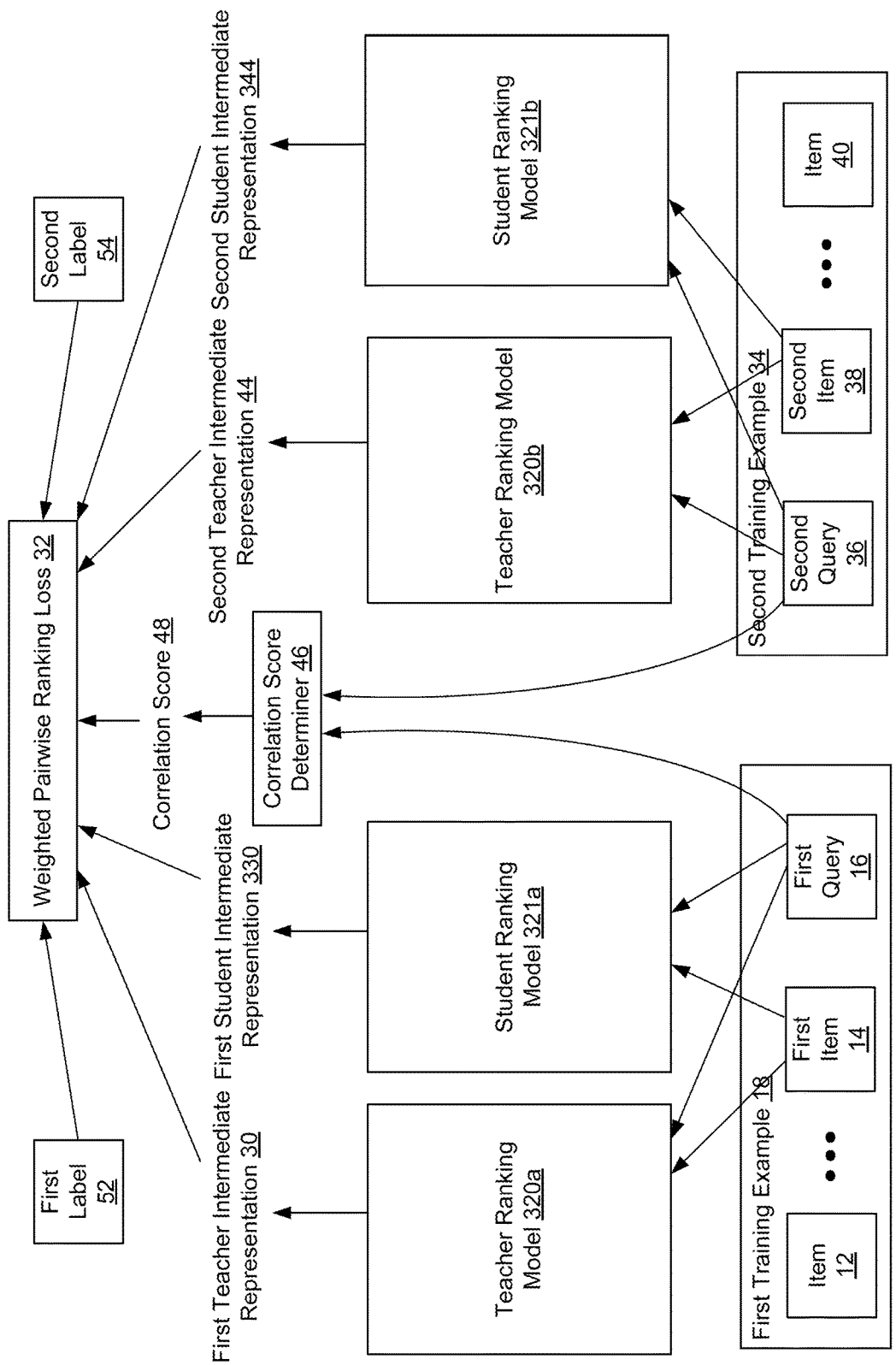
FIG. 3 depicts a diagram of an example framework to perform cross-list learning to rank with distillation according to example embodiments of the present disclosure.

FIG. 3 shows one example distillation approach along these lines. As shown in FIG. 3, a computing system can obtain a first training example 18 and a second, different training example 34. The first training example 18 can include a first plurality of items (e.g., items 12-14) and a first query 16. The second training example 34 can include a second plurality of items (e.g., items 38-40) and a second query 36.

The computing system can process a first item 14 from the first plurality of items with a teacher ranking model 320a to generate a first teacher intermediate representation 30 for the first item 14. Likewise, the computing system can process a second item 38 from the second plurality of items with the teacher ranking model 320b to generate a second teacher intermediate representation 44 for the second item 38.

The computing system can process the first item 14 from the first plurality of items with a student ranking model 321a to generate a first student intermediate representation 330 for the first item 14. Likewise, the computing system can process the second item 38 from the second plurality of items with the student ranking model 321b to generate a second student intermediate representation 344 for the second item 38.

The computing system can use a correlation score determiner 46 to determine a correlation score 48 between the first query 16 and the second query 36. For example, any of the similarity metrics described herein can be used. For example, cosine similarity between respective query embeddings can be evaluated.

The computing system can evaluate a weighted pairwise ranking loss 32 based on the first teacher intermediate representation 30, the second teacher intermediate representation 44, the first student intermediate representation 330, the second student intermediate representation 344, the correlation score 48, a first label 52 associated with the first item 14, and a second label 54 associated with the second item 38. The computing system can modify at least the student ranking model 321a/321b based on the weighted pairwise ranking loss 32 (e.g., via backpropagation). In some implementations, the teacher ranking model 320a/320b can also be updated in addition to the student model 321a/321b.

As one example, in some implementations, the weighted pairwise ranking loss 32 can evaluate a difference between a first value and a second value, the first value comprising a difference between the first teacher intermediate representation 30 and the second teacher intermediate representation 44, the second value comprising a difference between the first student intermediate representation 330 and the second student intermediate representation 344. For example, the weighted pairwise ranking loss 32 can take the form shown in Equation (9). Again, any combination of the indicator, scaling and correlation term can be included in the loss.

Example Devices and Systems

Figure 4A:
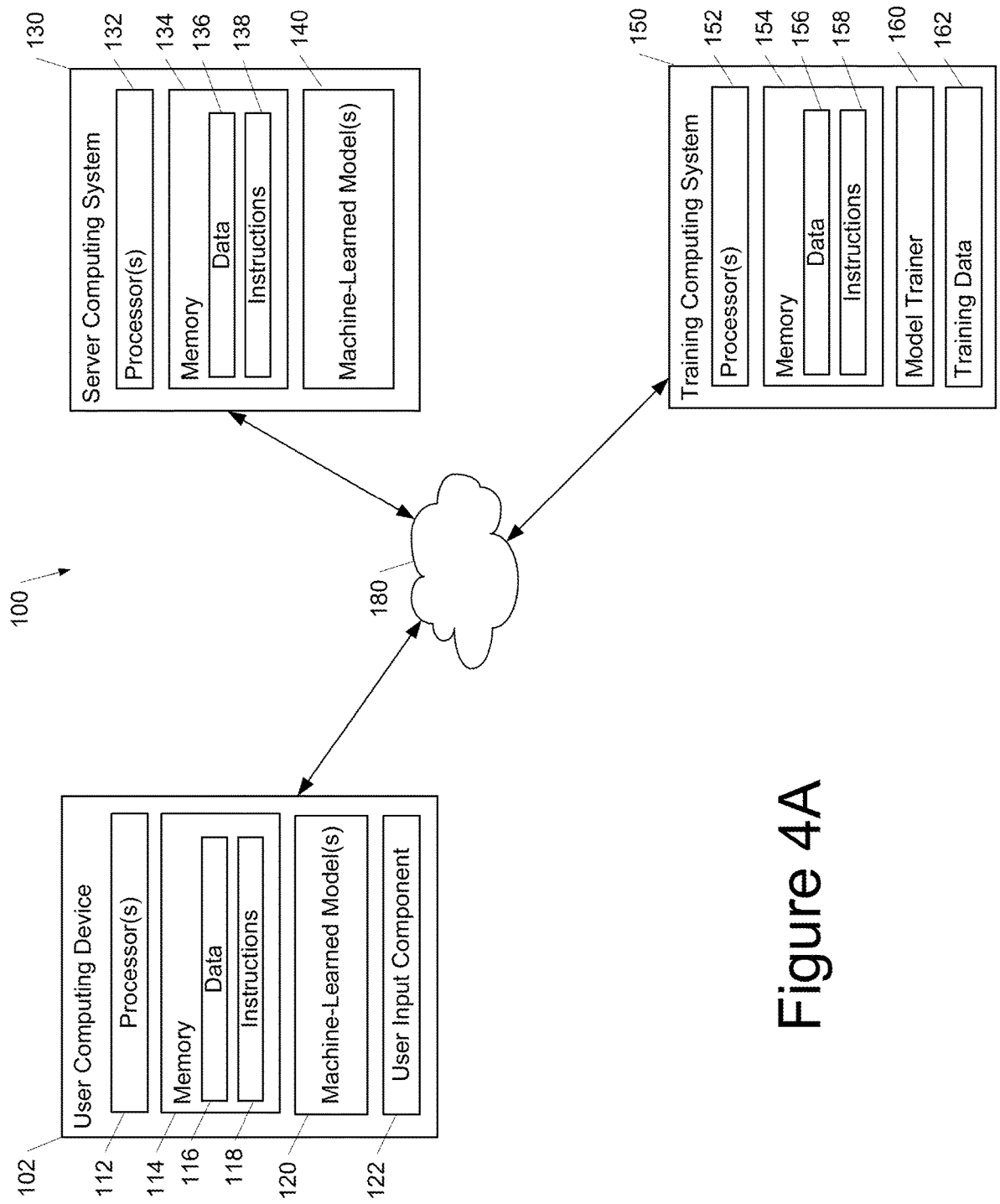
FIG. 4A depicts a block diagram of an example computing system according to example embodiments of the present disclosure.

FIG. 4A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned ranking models 120. For example, the machine-learned ranking models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned ranking models 120 can be received from the server computing system 130 over network 180, stored in the user computing device memory 114, and then used or otherwise implemented by the one or more processors 112. In some implementations, the user computing device 102 can implement multiple parallel instances of a single machine-learned ranking model 120 (e.g., to perform parallel ranking across multiple instances of pairwise inputs).

Additionally or alternatively, one or more machine-learned ranking models 140 can be included in or otherwise stored and implemented by the server computing system 130 that communicates with the user computing device 102 according to a client-server relationship. For example, the machine-learned ranking models 140 can be implemented by the server computing system 140 as a portion of a web service (e.g., an information retrieval service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned ranking models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned ranking models 120 and/or 140 based on a set of training data 162. The training data 162 can include, for example, inputs annotated with ground truth labels.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
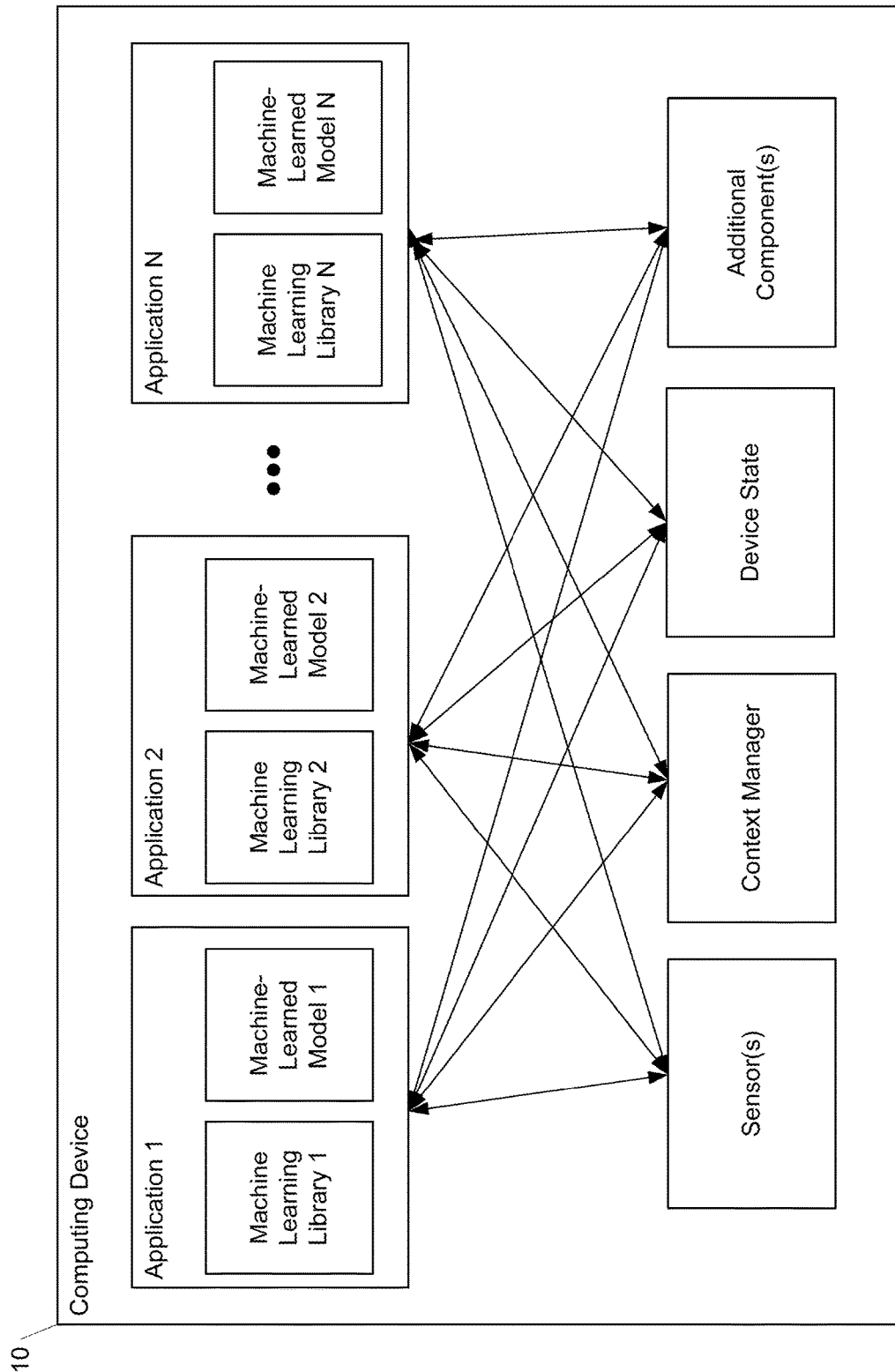
FIG. 4B depicts a block diagram of an example computing device according to example embodiments of the present disclosure.

FIG. 4B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
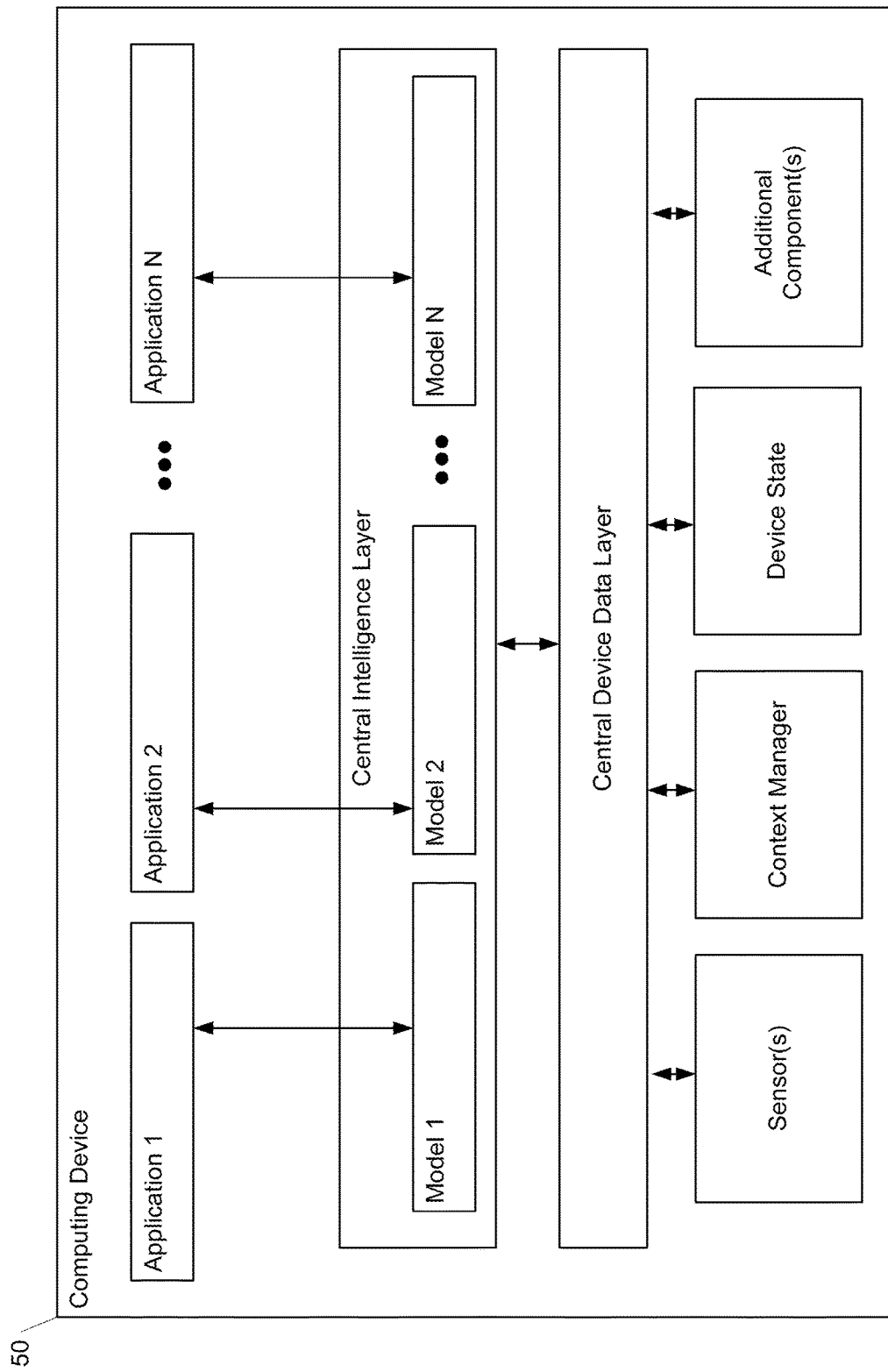
FIG. 4C depicts a block diagram of an example computing device according to example embodiments of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform cross-list learning to rank, the method comprising:
    obtaining, by a computing system comprising one or more computing devices, a first training example and a second, different training example, the first training example comprising a first plurality of items and a first query, and the second training example comprising a second plurality of items and a second query;
    processing, by the computing system, a first item from the first plurality of items with a ranking model to generate a first intermediate representation for the first item;
    processing, by the computing system, a second item from the second plurality of items with the ranking model to generate a second intermediate representation for the second item;
    determining, by the computing system, a correlation score between the first query and the second query;
    evaluating, by the computing system, a weighted pairwise ranking loss based on the first intermediate representation, the second intermediate representation, the correlation score, a first label associated with the first item, and a second label associated with the second item; and modifying, by the computing system, the ranking model based on the weighted pairwise ranking loss.

2. The computer-implemented method of claim 1, wherein determining, by the computing system, the correlation score between the first query and the second query comprises:
  generating, by the computing system, a first query embedding for the first query;
  generating, by the computing system, a second query embedding for the second query; and
  evaluating, by the computing system, a similarity metric between the first query embedding and the second query embedding to generate the correlation score.

3. The computer-implemented method of claim 2, wherein:
  generating, by the computing system, the first query embedding for the first query comprises processing the first query with one or more query layers of the ranking model;
  generating, by the computing system, the second query embedding for the second query comprises processing the second query with the one or more query layers of the ranking model; and
  the method further comprises determining, by the computing system, a first logit score for the first item and the first query as a dot product of the first intermediate representation for the first item and the first query embedding for the first query.

4. The computer-implemented method of claim 1, wherein evaluating, by the computing system, the weighted pairwise ranking loss based on the first intermediate representation, the second intermediate representation, the correlation score, the first label associated with the first item, and the second label associated with the second item comprises:
  scaling down, by the computing system, the weighted pairwise ranking loss using a scaling factor in response to the second query being different from the first query.

5. The computer-implemented method of claim 1, wherein evaluating, by the computing system, the weighted pairwise ranking loss based on the first intermediate representation, the second intermediate representation, the correlation score, the first label associated with the first item, and the second label associated with the second item comprises:
  evaluating, by the computing system, an identity function term included in the weighted pairwise ranking loss, wherein the identity function term equals zero when the correlation score is less than a threshold score and equals one when the correlation score is greater than the threshold score.

6. The computer-implemented method of claim 1, wherein evaluating, by the computing system, the weighted pairwise ranking loss based on the first intermediate representation, the second intermediate representation, the correlation score, the first label associated with the first item, and the second label associated with the second item comprises:
  weighting, by the computing system, the weighted pairwise ranking loss by an absolute value of the correlation score.

7. The computer-implemented method of claim 1, wherein evaluating, by the computing system, the weighted pairwise ranking loss based on the first intermediate representation, the second intermediate representation, the correlation score, the first label associated with the first item, and the second label associated with the second item comprises:
  normalizing, by the computing system, the weighted pairwise ranking loss based on a total weight associated with the first item and the second item.

8. The computer-implemented method of claim 1, further comprising:
  selecting, by the computing system, for evaluation with the weighted pairwise ranking loss, the first training example and the second training example from a batch of training examples based on query similarity.

9. The computer-implemented method of claim 1, wherein:
  the first training example and the second training example are included in a training dataset comprising a plurality of training examples; and
  the method comprises clustering the plurality of training examples into a plurality of training batches based on query similarity, whereby the first training example and the second training example are placed into a shared training batch for evaluation with the weighted pairwise ranking loss.

10. The computer-implemented method of claim 1, wherein determining, by the computing system, the correlation score between the first query and the second query comprises:
  processing, by the computing system, one or both of the first query and the second query with an attention network to determine the correlation score between the first query and the second query, wherein the attention network has been trained to predict a query embedding for one query from other queries included in a training batch.

11. One or more non-transitory computer-readable media that store computer-readable instructions that, when executed by a computing system, cause the computing system to perform operations, the operations comprising:
  obtaining, by the computing system, a first training example and a second, different training example, the first training example comprising a first plurality of items and a first query, and the second training example comprising a second plurality of items and a second query;
  processing, by the computing system, a first item from the first plurality of items with a ranking model to generate a first intermediate representation for the first item;
  processing, by the computing system, a second item from the second plurality of items with the ranking model to generate a second intermediate representation for the second item;
  determining, by the computing system, a correlation score between the first training example and the second training example based at least in part on a first attribute associated with the first training example and a second attribute associated with the second training example;
  evaluating, by the computing system, a weighted pairwise ranking loss based on the first intermediate representation, the second intermediate representation, the correlation score, a first label associated with the first item, and a second label associated with the second item; and
  modifying, by the computing system, the ranking model based on the weighted pairwise ranking loss.

12. The one or more non-transitory computer-readable media of claim 11, wherein the first attribute comprises a first feature of the first item and the second attribute comprises a second feature of the second item.

13. The one or more non-transitory computer-readable media of claim 12, wherein:
  the first item comprises a first content item and the first attribute comprises a first identity associated with a publisher of the first content item;

the second item comprises a second content item and the second attribute comprises a second identity associated with a publisher of the second content item.

14. The one or more non-transitory computer-readable media of claim 12, wherein:
the first item comprises a first content item and the first attribute comprises a first genre associated with the first content item;
the second item comprises a second content item and the second attribute comprises a second genre associated with the second content item.

15. The one or more non-transitory computer-readable media of claim 11, wherein the first attribute comprises first user feature associated with the first query and the second attribute comprises a second user feature associated with the second query.

16. A computing system to perform cross-list learning to rank to distill from a teacher ranking model to a student ranking model, the computing system configured to perform operations, the operations comprising:
obtaining, by the computing system, a first training example and a second, different training example, the first training example comprising a first plurality of items and a first query, and the second training example comprising a second plurality of items and a second query;
processing, by the computing system, a first item from the first plurality of items with the teacher ranking model to generate a first teacher intermediate representation for the first item;
processing, by the computing system, a second item from the second plurality of items with the teacher ranking model to generate a second teacher intermediate representation for the second item;
processing, by the computing system, the first item from the first plurality of items with the student ranking model to generate a first student intermediate representation for the first item;
processing, by the computing system, the second item from the second plurality of items with the student ranking model to generate a second student intermediate representation for the second item;
determining, by the computing system, a correlation score between the first query and the second query;
evaluating, by the computing system, a weighted pairwise ranking loss based on the first teacher intermediate representation, the second teacher intermediate representation, the first student intermediate representation, the second student intermediate representation, the correlation score, a first label associated with the first item, and a second label associated with the second item; and
modifying, by the computing system, at least the student ranking model based on the weighted pairwise ranking loss.

17. The computing system of claim 16, wherein the weighted pairwise ranking loss evaluates a difference between a first value and a second value, the first value comprising a difference between the first teacher intermediate representation and the second teacher intermediate representation, the second value comprising a difference between the first student intermediate representation and the second student intermediate representation.

18. The computing system of claim 16, wherein evaluating, by the computing system, the weighted pairwise ranking loss comprises:
scaling down, by the computing system, the weighted pairwise ranking loss using a scaling factor in response to the second query being different from the first query.

19. The computing system of claim 16, wherein evaluating, by the computing system, the weighted pairwise ranking loss comprises:
evaluating, by the computing system, an identity function term included in the weighted pairwise ranking loss, wherein the identity function term equals zero when the correlation score is less than a threshold score and equals one when the correlation score is greater than the threshold score.

20. The computing system of claim 16, wherein evaluating, by the computing system, the weighted pairwise ranking loss comprises:
weighting, by the computing system, the weighted pairwise ranking loss by an absolute value of the correlation score.

* * * * *